(12) United States Patent
Marsh et al.

(10) Patent No.: US 9,075,417 B2
(45) Date of Patent: Jul. 7, 2015

(54) CONTROLLED APPLICATION OF EXTERNAL FORCES TO A STRUCTURE FOR PRECISION LEVELING AND SECURING

(71) Applicant: The Boeing Company, Chicago, IL (US)

(72) Inventors: Bobby Joe Marsh, Lake Stevens, WA (US); Kinson D. VanScotter, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/248,589

(22) Filed: Apr. 9, 2014

(65) Prior Publication Data

US 2014/0222171 A1  Aug. 7, 2014

Related U.S. Application Data

(63) Continuation of application No. 11/944,872, filed on Nov. 26, 2007, now Pat. No. 8,700,191.

(51) Int. Cl.
*G05D 15/01* (2006.01)
*B66F 3/08* (2006.01)
*B66F 3/46* (2006.01)

(52) U.S. Cl.
CPC *G05D 15/01* (2013.01); *B66F 3/08* (2013.01); *B66F 3/46* (2013.01)

(58) Field of Classification Search
USPC .......... 700/42, 54, 60, 65, 174, 213; 187/203, 187/288, 389; 405/230, 232, 233, 244, 247; 254/92
See application file for complete search history.

(56) References Cited

U.S. PATENT DOCUMENTS

| 4,081,992 A | 4/1978 | Aurora et al. |
| 4,718,842 A | 1/1988 | Labbe et al. |
| 4,736,633 A | 4/1988 | Duppong et al. |
| 4,805,652 A | 2/1989 | Hartley et al. |
| 4,812,984 A | 3/1989 | Yerly et al. |

(Continued)

FOREIGN PATENT DOCUMENTS

| WO | WO 0113767 | 3/2001 |
| WO | WO 2009128992 | 10/2009 |

OTHER PUBLICATIONS

Siebenaler et al., Prediction of workpiece deformation in a fixture system using finite element method, Int. J. of Machine Tools & Manufacture, 2006.*

(Continued)

*Primary Examiner* — Darrin Dunn
(74) *Attorney, Agent, or Firm* — Baldauff IP, LLC; Michael J. Baldauff, Jr.

(57) ABSTRACT

Methods provide for the controlled application of forces to a structure during leveling and securing procedures. According to embodiments described herein, a structure is supported at a number of support locations. An upward force is applied to the structure by the force application devices to counteract an equivalent downward force from the structure at each support location. The forces applied by the force application devices are monitored to detect whenever one or more of the upward forces deviates outside of a threshold range of force values, which includes a quantity of force sufficient to counteract internal forces within a material of the structure. Each force may be adjusted to ensure no deviation outside of the allowed threshold range.

11 Claims, 10 Drawing Sheets

(56) References Cited

U.S. PATENT DOCUMENTS

| | | | |
|---|---|---|---|
| 5,026,245 A | 6/1991 | Sabo | |
| 5,374,025 A | 12/1994 | Whelpley et al. | |
| 5,546,817 A * | 8/1996 | Heiman | 73/862.333 |
| 5,580,095 A | 12/1996 | Fukumoto | |
| 5,592,791 A | 1/1997 | D'Annunzio et al. | |
| 5,596,144 A | 1/1997 | Swanson | |
| 5,970,665 A | 10/1999 | Oudman | |
| 6,027,398 A | 2/2000 | Numoto et al. | |
| 6,088,642 A | 7/2000 | Finkelstein et al. | |
| 6,094,762 A | 8/2000 | Viard et al. | |
| 6,098,000 A | 8/2000 | Long et al. | |
| 6,193,442 B1 | 2/2001 | May | |
| 6,199,427 B1 * | 3/2001 | Kroll et al. | 73/161 |
| 6,203,105 B1 | 3/2001 | Rhodes, Jr. | |
| 6,384,715 B1 | 5/2002 | Potter | |
| 6,422,087 B1 | 7/2002 | Potter | |
| 6,427,538 B1 | 8/2002 | Potter | |
| 6,560,804 B2 | 5/2003 | Wise et al. | |
| 6,640,685 B2 | 11/2003 | Hamby | |
| 6,776,692 B1 | 8/2004 | Zuniga et al. | |
| 6,923,599 B2 * | 8/2005 | Kelso | 405/230 |
| 7,150,673 B2 | 12/2006 | Sakurai et al. | |
| 7,152,920 B2 | 12/2006 | Suglyama et al. | |
| 7,208,896 B2 | 4/2007 | Ford et al. | |
| 7,226,057 B2 | 6/2007 | Eichhom et al. | |
| 7,459,645 B2 | 12/2008 | Skinner et al. | |
| 7,493,194 B2 | 2/2009 | Venugopal | |
| 7,503,251 B2 | 3/2009 | Kawaguchi et al. | |
| 7,534,077 B2 | 5/2009 | Ban et al. | |
| 7,617,018 B2 | 11/2009 | Ford et al. | |
| 7,670,206 B2 | 3/2010 | Togawa et al. | |
| 7,672,817 B2 | 3/2010 | Marsh et al. | |
| 7,714,238 B2 | 5/2010 | Skinner et al. | |
| 7,756,321 B2 | 7/2010 | Marsh et al. | |
| 7,787,979 B2 | 8/2010 | Marsh et al. | |
| 7,967,531 B2 | 6/2011 | Collina et al. | |
| 8,125,173 B2 | 2/2012 | Terashima et al. | |
| 2001/0039681 A1 | 11/2001 | Johnson et al. | |
| 2002/0144862 A1 * | 10/2002 | Engvall et al. | 182/18 |
| 2004/0046337 A1 | 3/2004 | Sproat et al. | |
| 2004/0200327 A1 | 10/2004 | Baker | |
| 2004/0211945 A1 | 10/2004 | Maggiori | |
| 2005/0020185 A1 | 1/2005 | Zuniga et al. | |
| 2005/0093552 A1 | 5/2005 | Ahrikencheikh | |
| 2005/0159840 A1 | 7/2005 | Lin et al. | |
| 2005/0169732 A1 * | 8/2005 | Sveum et al. | 414/401 |
| 2005/0186691 A1 | 8/2005 | Koike et al. | |
| 2005/0211534 A1 | 9/2005 | Tefend | |
| 2006/0009127 A1 | 1/2006 | Sakurai et al. | |
| 2006/0039768 A1 | 2/2006 | Ban et al. | |
| 2006/0059814 A1 | 3/2006 | Metz et al. | |
| 2006/0188329 A1 | 8/2006 | Cobb | |
| 2006/0196283 A1 | 9/2006 | Yang et al. | |
| 2007/0174964 A1 | 8/2007 | Lemire et al. | |
| 2007/0175016 A1 | 8/2007 | Sievers et al. | |
| 2007/0189887 A1 | 8/2007 | Lindblom | |
| 2007/0205405 A1 * | 9/2007 | Stockmaster et al. | 254/275 |
| 2007/0269295 A1 | 11/2007 | Guenther | |
| 2007/0272450 A1 | 11/2007 | Skinner et al. | |
| 2008/0006806 A1 | 1/2008 | Hall et al. | |
| 2008/0114500 A1 | 5/2008 | Hull et al. | |
| 2008/0139087 A1 | 6/2008 | Togawa et al. | |
| 2008/0314649 A1 | 12/2008 | Hansen | |
| 2009/0050413 A1 | 2/2009 | Nilsson | |
| 2009/0138126 A1 | 5/2009 | Marsh et al. | |
| 2009/0272952 A1 | 11/2009 | Manuel Alguera | |
| 2010/0044978 A1 | 2/2010 | Delorenzis et al. | |
| 2011/0190941 A1 | 8/2011 | Marsh et al. | |

OTHER PUBLICATIONS

S. Kashyap et al., Finite element analysis and optimization in fixture design, Structural Optimization, 1999.*
Nova-Tech Engineering, Inc., http://web.archive.org/web/20110207030356/http://www.ntew.com/ Archived Oct. 10, 2007, Printed Feb. 3, 2012.
Extended European Search Report dated Oct. 30, 2013 in EP Application Serial No. 11152746.1.
U.S. Office Action dated Sep. 24, 2013 in U.S. Appl. No. 12/697,752.
U.S. Office Action dated Feb. 1, 2012 in U.S. Appl. No. 12/697,752.
U.S. Notice of Allowance dated Jun. 28, 2012 in U.S. Appl. No. 12/697,752.
U.S. Notice of Allowance dated Mar. 6, 2014 in U.S. Appl. No. 12/697,752.
SAE International Paper 2009-01-3088 entitled, "Laser Tracker and Digital Photogrammetry's Merged Process for Large Scale Rapid Scanning." Authored by Bobby J. Marsh and published on Nov. 2009; 8 pages.
U.S. Office Action dated Mar. 17, 2010 in U.S. Appl. No. 11/944,872.
U.S. Office Action dated Sep. 29, 2010 in U.S. Appl. No. 11/944,872.
U.S. Office Action dated May 10, 2012 in U.S. Appl. No. 11/944,872.
U.S. Office Action dated Dec. 17, 2012 in U.S. Appl. No. 11/944,872.
U.S. Office Action dated Jun. 19, 2013 in U.S. Appl. No. 11/944,872.
U.S. Notice of Allowance dated Nov. 29, 2013 in U.S. Appl. No. 11/944,872.

* cited by examiner

CONTROLLED APPLICATION OF EXTERNAL FORCES TO A STRUCTURE FOR PRECISION LEVELING AND SECURING

CROSS-REFERENCE TO RELATED APPLICATIONS

This application is a continuation of co-pending U.S. patent application Ser. No. 11/944,872, filed on Nov. 26, 2007, entitled "Controlled Application of External Forces to a Structure for Precision Leveling and Securing," which is expressly incorporated by reference in its entirety.

TECHNICAL FIELD

The present disclosure relates generally to leveling and machining structures, and more particularly to applying, monitoring, and adjusting external forces while leveling or securing a structure.

BACKGROUND

When utilizing a part, whether the part is a tool for fabricating a structure or a structure under fabrication, it is often necessary to precisely level the part with respect to the earth and to maintain the level position for the duration of the fabrication process. When the part is very large, leveling and maintaining a level position can be difficult due to internal and external factors. Internally, the part may be subject to twisting and straining over time due to internal forces present within the part. Externally, the part may undergo minor or even significant movement due to shifts in the earth on which the part is initially leveled. Conventional leveling systems typically involve using laser-tracking equipment to "survey" the part and to identify coordinates at which identified points on the part should be positioned when level. These identified points on the part are positioned at the specific coordinates and are periodically re-surveyed during drift checks to ensure that they are maintaining position. This optical leveling procedure is time consuming and cumbersome, requiring expensive laser-tracking equipment.

Similarly, internal forces within a machined part may cause the part to deform after the machining process. When a large tool or structure is machined, the structure must be clamped down into position and held in place during the machining process. At one or more time during the machining process, the structure may need to undergo a stress relief procedure to relieve the internal stresses of the material being machined. During the stress relief procedure, the hold-down clamps are released, and the structure is subjected to heat and/or vibration to relieve any internal stress induced by or present during the initial machining process. The hold-down clamps are then re-applied and the machining process continues. However, the force applied by the hold-down clamps when re-engaged after the stress relief procedure may not be the same as the force applied during the initial clamping process and may not be consistent among all of the clamps. As a result, additional and variable internal forces may be induced by the clamps that result in the finished structure deforming into an undesirable shape.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods described herein provide for the controlled application and management of external forces to a structure for precision leveling and machining. The embodiments disclosed herein provide for supporting a structure at a number of support locations. An upward force is applied to the structure by the force application devices to counteract an equivalent downward force from the structure at each support location. The forces applied by the force application devices are monitored to detect whenever one or more of the upward forces deviates outside of a threshold range of force values, which includes a quantity of force sufficient to counteract internal forces within a material of the structure. If a force does deviate outside of the allowed threshold range, then the force is adjusted until it is again within the desired threshold range.

According to other embodiments described herein, a method for securing a structure during machining includes using a number of force application devices to apply a force at a number of securing locations to secure the structure. The forces that are applied at the securing locations are substantially equivalent to one another. These forces are monitored to detect whether any of them deviate from a threshold range of values, and if so, then the force applied at the deviating location is adjusted to bring the applied force back within the desired range.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to methods and systems for controlling the force distribution of external forces applied to a structure for precision leveling and machining. As discussed briefly above, conventional large structure leveling procedures require cumbersome optical leveling equipment and periodic drift checks, which include time consuming laser tracking of structural points to "level" coordinates to determine how much the structure has shifted and to aid in returning those structural points to the level coordinates. Similarly, conventional hold-down clamps used to secure a structure during a machining process allow for an asymmetrical force distribution among the clamps and inconsistent re-application of forces by the clamps when re-engaging them after stress relief procedures are performed. This asymmetrical force distribution may induce internal forces within the structure that cause the structure to spring out of shape when the machining process is complete and the hold-down clamps are removed.

The embodiments described below provide a force distribution system that overcomes these limitations with conventional leveling and machining procedures using a system of interconnected force application devices (jack and clamp assemblies) and a computing device to monitor and control the forces applied to the structure by the force application devices. Using these embodiments, precise forces may be applied to the structure at various locations to allow jack assemblies to counteract the downward forces created by the structure at those locations in order to level the structure in the desired position. By continuously monitoring and adjusting the forces applied by the jack assemblies, the computing device can ensure that the structure remains leveled even when internal or external factors would otherwise shift the structure out of the desired position. Similarly, the embodiments described below provide for the application of force by a number of clamp assemblies to secure a structure while it is being machined. The forces applied by the clamp assemblies are continuously monitored and adjusted to ensure that equivalent and consistent forces are used to secure the structure in order to prevent the inducement of internal forces during the machining process that would result in the structure deforming out of shape when the clamp assemblies are removed.

Figure 1:
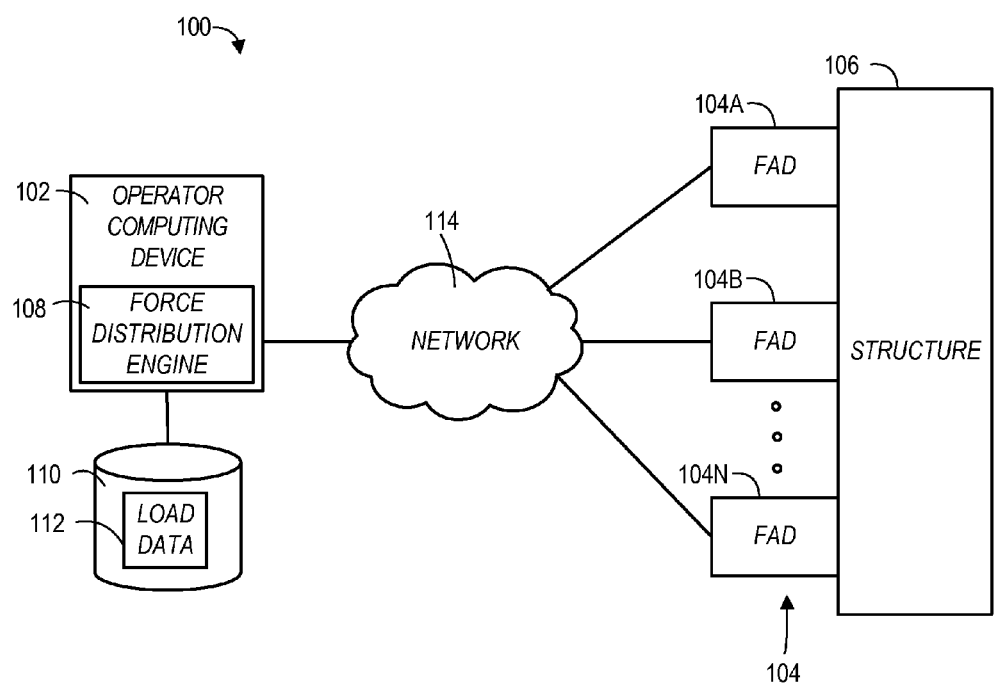
FIG. 1 is a block diagram showing elements of a force distribution system according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, aspects of a force distribution system will be described. FIG. 1 shows force distribution system 100 according to various embodiments described herein. The force distribution system 100 includes an operator computing device 102 that is communicatively linked to a number of force application devices 104A-104N, which each apply a force to a structure 106. According to one embodiment described below with respect to FIGS. 2-4, the force application devices 104 include jack assemblies that are used to support and level the structure 106. According to another embodiment described below with respect to FIGS. 5-8, the force application devices include clamp assemblies used to secure the structure 106 during machining. It should be appreciated that the structure 106 may be any part, tool, or other structure that requires leveling and/or machining.

The operator computing device 102 may include any type of computing device capable of executing a force distribution engine 108 for applying, monitoring, and adjusting forces via the force application devices 104 as described with respect to the various embodiments below. Examples include, but are not limited to, a desktop computer, a notebook computer, a personal data assistant, or any hand-held portable computing device. The computer architecture associated with the operator computing device 102 is described below with respect to FIG. 9.

The force distribution engine 108 includes software and/or hardware that is operative to monitor and control the forces applied by the force application devices 104 in the various manners described below. The operator computing device 102 and force distribution engine 108 are communicatively linked to a database 110 that stores load data 112 corresponding to the forces measured at the force application devices 104. It should be appreciated that the load data 112 may alternatively be stored within the operator computing device 102 or at a remote location.

The force application devices 104 and the operator computing device 102 may communicate via direct connections, or via a network 114. The network 114 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. The network 114 may also be a wired network such as, but not limited to, a wired Wide Area Network (WAN), a wired Local Area Network (LAN) such as the Ethernet, a wired Personal Area Network (PAN), or a wired Metropolitan Area Network (MAN). The network 114 may also include the Internet such that the network communications occur via wireless or wired connections to the Internet.

Figure 2:
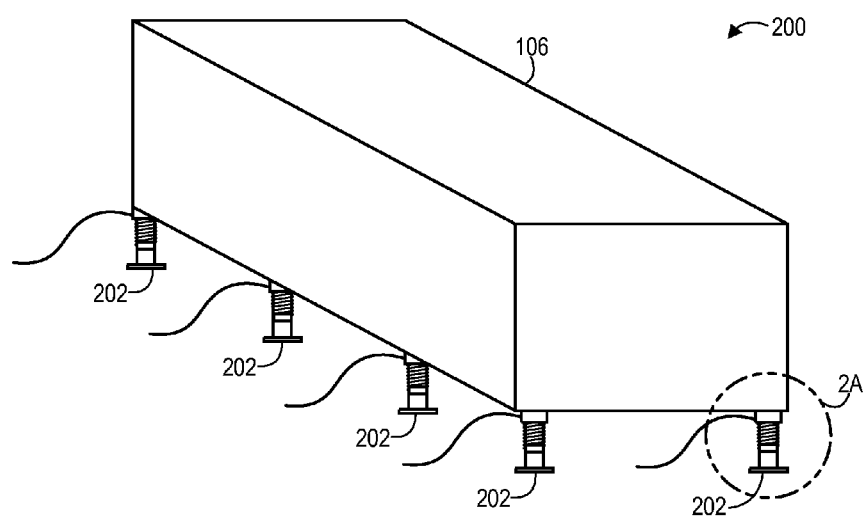
FIG. 2 is a pictorial diagram of a portion of a force distribution system showing jack assemblies supporting a structure according to various embodiments presented herein.

Turning now to FIG. 2, a structural leveling system 200 will be described. The structural leveling system 200 is an embodiment of the force distribution system 100 in which the force application devices 104 include jack assemblies 202 that are used to support and maintain the structure 106 in a level, or desired, position. According to the structural leveling system 200, a number of jack assemblies 202 are positioned at supporting locations underneath the structure 106. The precise number and positions of the supporting locations may be determined using any known engineering techniques such as finite element analysis. For example, if the structure 106 is a very rigid structure that has a uniform mass distribution and relatively little weight, then fewer jack assemblies 202 may be required than if the structure 106 is a heavy, flexible structure with an uneven mass distribution. In the first scenario, the jack assemblies 202 may be evenly spaced under the structure 106, while in the latter scenario, the jack assemblies 202 may be grouped more closely under the heavier portions of the structure 106 to limit the deflection of the structure 106 between jack assemblies 202.

Figure 2A:
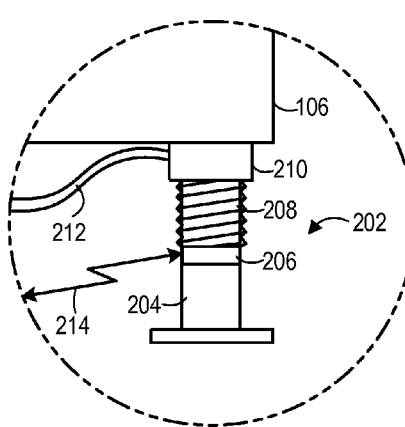
FIG. 2A is a magnified view of a jack assembly shown in FIG. 2 according to various embodiments presented herein.

FIG. 2A shows a close up view of one of the jack assemblies 202 according to one embodiment. The jack assembly 202 includes a body 204, an extendable segment 208, and a displacement mechanism 206 for controlling the movement of the extendable segment 208 with respect to the body 204. According to one embodiment, the jack assembly 202 is a ball screw or jackscrew type of jack in which the extendable segment 208 screws in and out of the body 204, retracting and extending the jack assembly 202. However, it should be understood that any type of jack assembly 202 that is capable of applying pressure to an underside of the structure 106 in order to control the height of the structure 106 at that location may be used without departing from the scope of this disclosure. The displacement mechanism 206 extends and retracts the extendable segment 208 to control the force applied to the structure 106. The displacement mechanism 206 may be a servomotor, hydraulic actuator, pneumatic actuator, or any other type of mechanism capable of extending the jack assembly 202 to apply force to the structure 106 and retracting the jack assembly 202 to remove force from the structure 106.

The jack assembly 202 additionally includes a force sensor 210. The force sensor 210 may be a load cell, pressure gauge, piezoelectric sensor, or any other type of force sensor capable of measuring the quantity of force applied to the structure 106 by the jack assembly 202. It should be appreciated that the force sensor 210 may be located between the extendable segment 208 and the structure 106 as shown, or may be located in any other suitable position, including within the displacement mechanism 206, for measuring the force exerted on the structure by the jack assembly 202.

As discussed above, the communications between the force distribution engine 108 and the jack assembly 202 may be wired or wireless. For illustration purposes, FIG. 2A shows a wireless connection 214 between the operator computing device 102 and the displacement mechanism 206. This wireless connection 214 is used for sending control commands from the operator computing device 102 to the displacement mechanism 206 to operate the jack assembly 202 to control the amount of force placed on the structure 106. A communications cable 212 is shown to connect each force sensor 210 to the operator computing device 102 for transmitting force measurements from each force sensor 210 to the operator computing device 102.

However, it should be appreciated that any communications between the operator computing device 102 and the force application devices 104 may be wired or wireless. According to one embodiment, the jack assembly 202 includes a single transceiver and processor for wirelessly transmitting force measurements from the force sensor 210 and for receiving control commands for the displacement mechanism 206. The displacement mechanism 206, if electrically driven, may utilize a battery as a power source to eliminate any required power cables. This completely wireless environment allows for the greatest flexibility of the structural leveling system 200 by removing the need for all wires, which increases the portability of the system. The embodiments described herein allow for the jack assemblies 202 to be placed within cases and transported to the operating location along with a notebook computer containing the force distribution engine 108. Portability is a distinct advantage of the embodiments described herein as compared to traditional optical leveling equipment.

Figure 3:
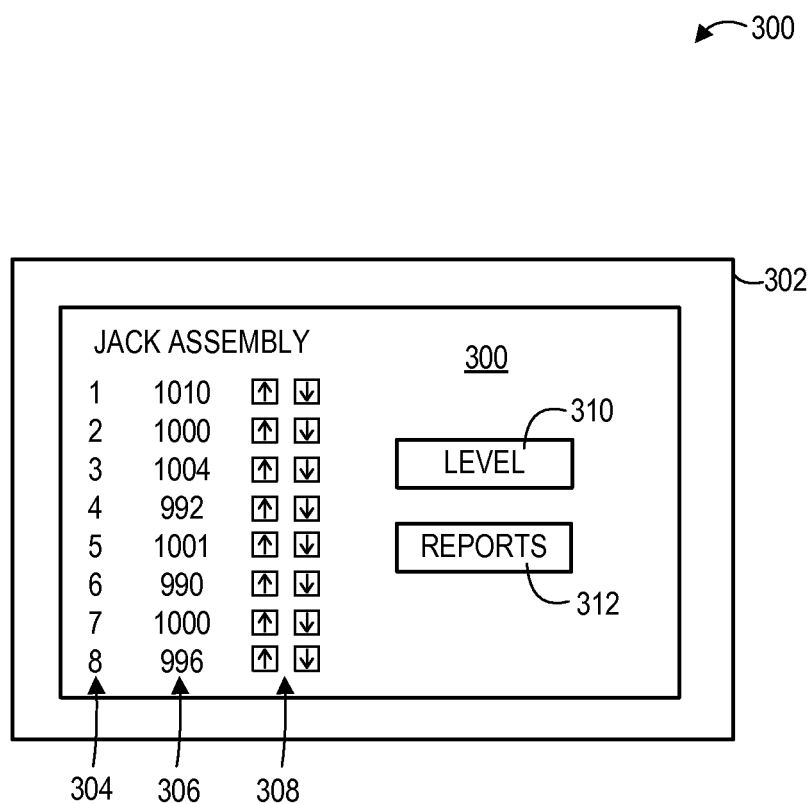
FIG. 3 is a screen diagram depicting a user interface for the monitoring and manual control of a structural leveling system according to various embodiments presented herein.

FIG. 3 shows an illustrative screen shot of a user interface 300 on a display 302 of the operator computing device 102 according to one embodiment described herein. According to this embodiment, the force distribution engine 108 provides the user interface 300 for monitoring and manual control of the structural leveling system 200. The user interface 300 includes an ID column 304, which identifies each jack assembly 202 of the structural leveling system 200. As discussed above, the number of jack assemblies 202 may vary according to the characteristics of the structure 106 being supported. According to the example shown in FIG. 3, there are eight jack assemblies 202 within the sample structural leveling system 200.

The user interface 300 further includes a force measurement column 306, which displays the current forces measured by each jack assembly 202. For example, the first jack assembly 202 is supporting 1,010 pounds, while the sixth jack assembly 202 is supporting 990 pounds. The manual adjustment column 308 provides action buttons for rising or lowering each jack assembly 202 to adjust the force applied to the structure by that particular jack assembly 202. For example, if a technician decided to manually increase the force applied to the structure with the sixth jack assembly 202, then he or she could use a mouse or other input device to select the up arrow corresponding to the sixth jack assembly 202 until the associated force measurement reached the desired reading. Of course, doing so could affect the force measurements of the adjacent jack assemblies 202. It should be appreciated that according to various embodiments, manually adjusting the force applied at a jack assembly 202 may additionally change the corresponding tolerance range associated with the particular jack assembly 202 in order to allow for minor fluctuations in force measurements around the target measurement without triggering a force adjustment.

Each jack assembly 202 has a calculated target force value and a surrounding tolerance range, or threshold range of force values. Target force values are calculated for each jack assembly 202 at each support position. The target force values are those forces that if applied at the calculated support positions, would result in the desired level position of the structure 106. Each target force value has a corresponding threshold range of force values that allows for minor fluctuations in force measurements without constant adjustment of the corresponding applied forces.

According to various embodiments described herein, the force distribution engine 108 will monitor the forces applied at each jack assembly 202 to ensure that the forces do not deviate from the corresponding threshold range of force values. Due to changing internal and external factors, the shape of the structure 106 may change slightly over time. This change will alter the force measurements at one or more jack assemblies 202. Once the force distribution engine 108 determines that a particular force measurement is out of tolerance, or out of a pre-determined threshold range of force values, then the force distribution engine 108 will activate the associated displacement mechanism 206 to apply or remove force until the force measurement is again within tolerance, or within the pre-determined threshold range of force values.

It should be understood that the target force values and corresponding threshold ranges of acceptable force values are established using known engineering analysis tools and techniques such as finite element analysis when the support positions for each jack assembly 202 and the quantity of required jack assemblies 202 are determined. It should be appreciated that the quantity of jack assemblies 202, the support positions for each of the jack assemblies 202, the target forces applied by each of the jack assemblies 202, and the threshold range of acceptable force values for each jack assembly 202 may be calculated by the force distribution engine 108 after receiving input regarding the characteristics of the structure 106, or may be input into the force distribution engine 108 by an operator using input fields (not shown) of the user interface 300.

The user interface 300 may additionally include a "level" selection 310 that may be selected to trigger the force distribution engine 108 to re-adjust all of the jack assemblies 202 in an effort to more closely achieve the pre-determined target force for each jack assembly 202. This may be particularly useful to return the structure to a default level condition achieved when the jack assemblies 202 are adjusted to apply to determined target force values after manually manipulating the structural leveling system 200 using the action buttons in the manual adjustment column 308. Finally, the user interface 300 may include a "reports" selection 312 that would allow a user to create any number and type of reports using historical load data 112 stored in the database 110.

Figure 4:
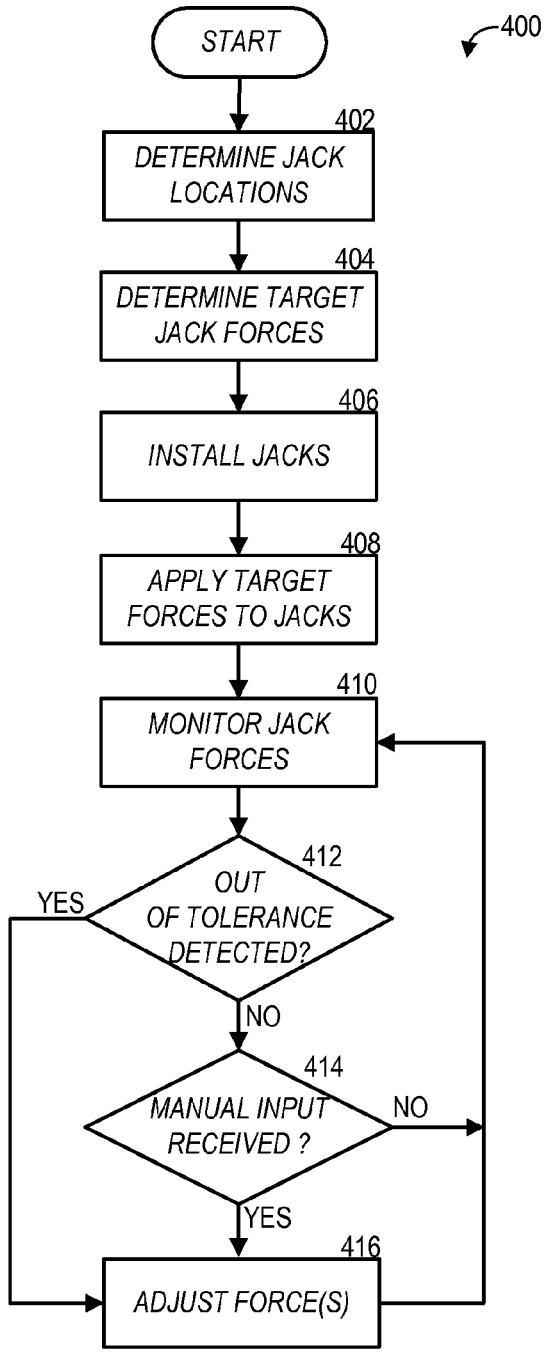
FIG. 4 is a flow diagram illustrating a method for supporting a structure according to various embodiments presented herein.

Turning now to FIG. 4, an illustrative routine 400 for supporting a structure in a desired level position using the force distribution system 100 will now be described in detail. The routine 400 will be described with respect to the structural leveling system 200 embodiment of the force distribution system 100, as shown above in FIGS. 2 and 3 above. The routine 400 begins at operation 402, where the support positions for the jack assemblies 202 are determined. From operation 402, the routine 400 continues to operation 404, where the target forces for each of the jack assemblies 202 are determined. As described above, the support positions and target forces for the jack assemblies 202 may be determined by the force distribution engine 108 using characteristics of the structure 106 being leveled.

The routine 400 continues from operation 404 to operation 406, where one or more technicians install the jack assemblies 202 at the determined support positions. After the jack assemblies 202 are installed, the routine 400 continues to operation 408, where the target forces are applied to each of the jack assemblies 202 to achieve the desired level position of the structure 106. According to one embodiment, the one or more jack assemblies 202 closest to the center of gravity of the structure 106 are adjusted first until the corresponding force measurement is approximately the target force. Moving outward, each subsequent jack assembly 202 is adjusted to the target force until all of the jack assemblies 202 are applying the corresponding target force, or a force within the threshold range associated with the target force, to the structure. It should be appreciated that this initial force application process may occur manually, for example, through the use of the action buttons in the manual adjustment column 308 of the user interface 300, or may be entirely executed by the force distribution engine 108 after a technician chooses the "level" selection 310 of the user interface 300.

From operation 408, the routine 400 continues to operation 410, where the force distribution engine 108 monitors the force measurements from each of the force sensors 210 of the corresponding jack assemblies 202 to ensure that they remain within the threshold range of force values. At operation 412, the force distribution engine 108 determines whether any of the force measurements have deviated outside of the applicable threshold range of force values to create an out of tolerance condition at one or more of the jack assemblies 202. If any of the force measurements have deviated outside of the applicable threshold range of values, the routine 400 proceeds to operation 416, where the force distribution engine 108 sends a control signal to the applicable displacement mechanism 206 of the deviated jack assembly 202 to adjust the force value back within the threshold range of values. From operation 416, the routine 400 returns to operation 410 and continues as described above.

However, if at operation 412, the force distribution engine 108 does not detect an out of tolerance force measurement, then the routine 400 continues to operation 414, where the force distribution engine 108 determines whether any manual force adjustment input has been received via the user interface 300. If the force distribution engine 108 does not detect any manual force adjustment input, then the routine returns to operation 410 and continues as described above. However, if at operation 414, manual force adjustment input has been received, then the routine 400 proceeds to operation 416, where the force distribution engine 108 sends a control signal to the applicable displacement mechanism 206 of the targeted jack assembly 202 to adjust the force value according to the manual input. From operation 416, the routine 400 returns to operation 410 and continues as described above.

Figure 5:
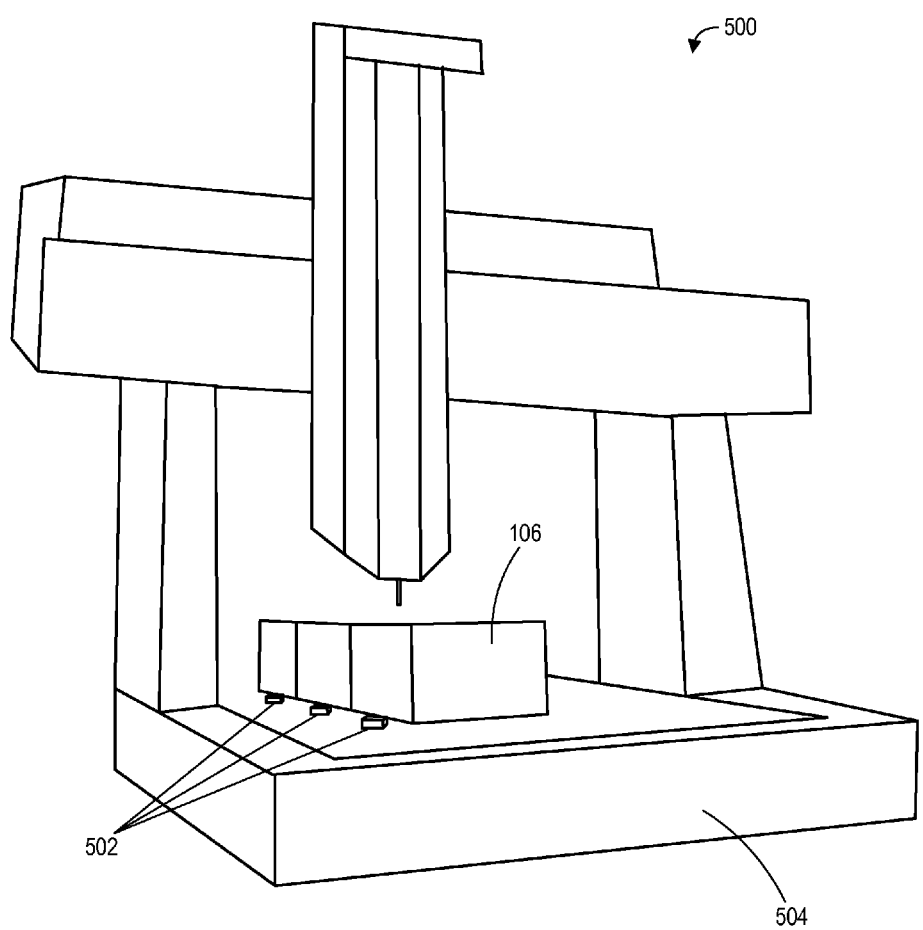
FIG. 5 is a pictorial diagram of a portion of a force distribution system showing clamp assemblies securing a structure according to various embodiments presented herein.
Figure 6:
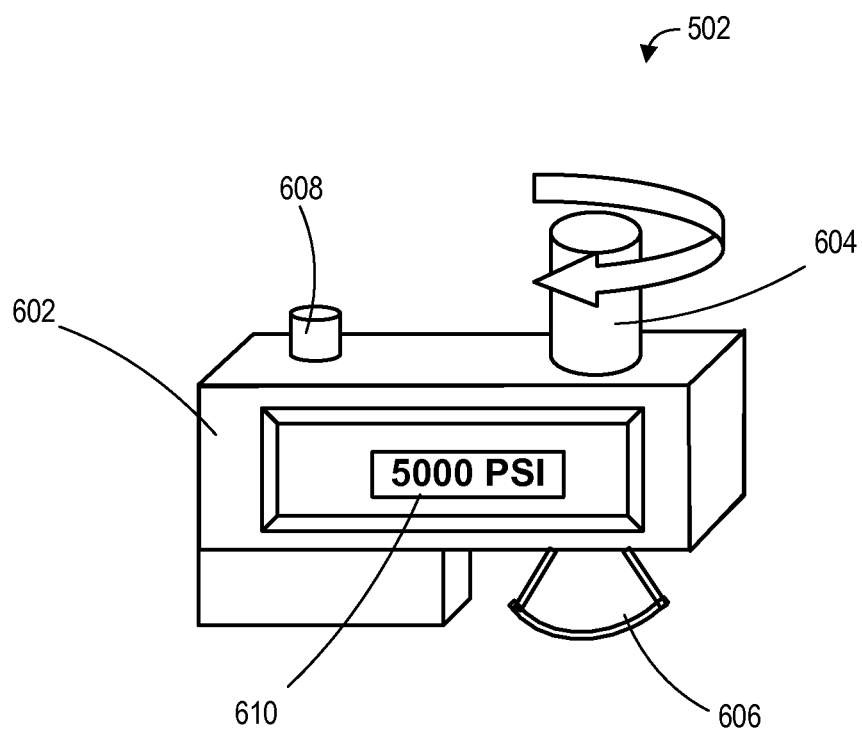
FIG. 6 is a pictorial diagram of a clamp assembly according to various embodiments presented herein.

FIG. 5 shows a structural securing system 500 according to various embodiments described herein. The structural securing system 500 is an embodiment of the force distribution system 100 in which the force application devices 104 include clamp assemblies 502 that are used to secure the structure 106 with substantially equivalent, consistent forces while being machined by a piece of equipment 504. While three clamp assemblies 502 are shown, it should be appreciated that any number of clamp assemblies 502 may be used without departing from the scope of this disclosure. A clamp assembly 502 is shown in FIG. 6 according to various embodiments described herein. The clamp assembly 502 includes a clamp body 602, a motor 604, a force application pad 606, and a force sensor within the clamp body (not shown). The motor is capable of driving the force application pad 606 against the structure 106 to hold the structure 106 in place.

Similar to the jack assemblies 202 described above, the clamp assemblies 502 are set by the force distribution engine 108 to apply and maintain a target force against the structure 106. When securing the structure 106, it may be beneficial for all of the clamp assemblies 502 to maintain a substantially equivalent force depending on the properties of the structure 106. As discussed above, when the clamp assemblies 502 are disengaged to perform stress relief procedures to relieve internal stresses of the structure 106, it is important to re-apply the appropriate target force to the clamp assemblies 502 while finishing the machining process to ensure that the clamp assemblies 502 do not create undesirable internal forces that would result in a deformed finished structure 106. By monitoring and adjusting the forces applied by the clamp assemblies 502 in much the same way as that described above with respect to the jack assemblies 202 of the structural leveling system 200, the force distribution engine 108 can ensure a consistent and appropriate application of force among all of the clamp assemblies 502.

When the force distribution engine 108 detects that the force measurement from the force sensor within a clamp assembly 502 is outside of the threshold range of force values, the force distribution engine 108 may adjust the force by sending a control signal to the motor 604 of the clamp assembly 502, and/or the force distribution engine 108 may alert a technician. To alert the technician, the force distribution engine 108 may illuminate a warning indicator 608 on the applicable clamp assembly 502 or machining equipment 504, initiate an audible alarm, display a warning on the operator computing device 102, or any combination thereof. It should additionally be noted that the clamp assemblies 502, may optionally have pressure readings 610 from the force sensors on the clamp body 602 in addition to transmitting the pressure reading 610 to the operator computing device 102 for display.

Figure 7:
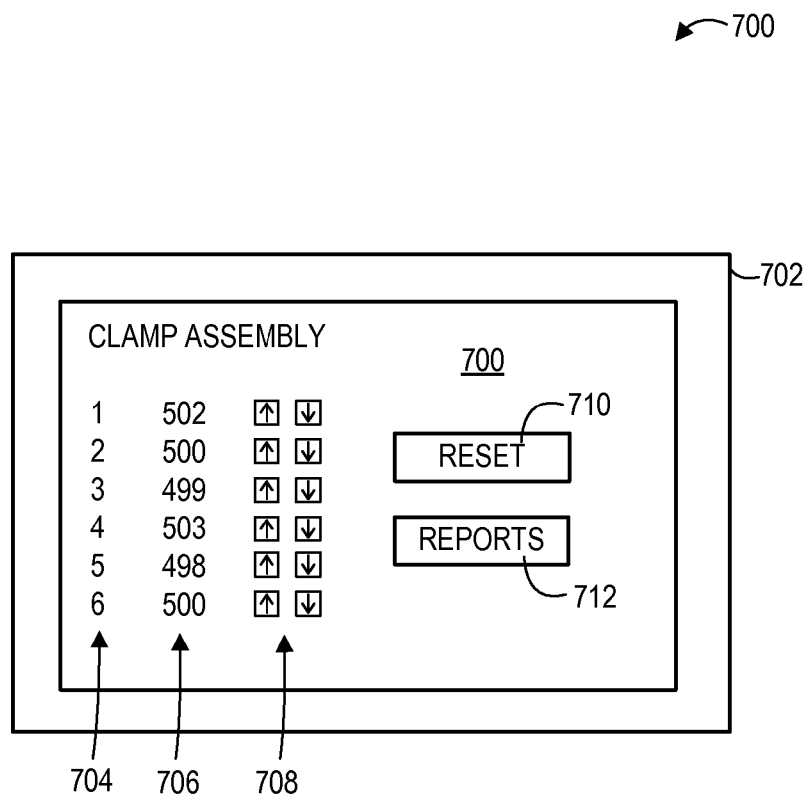
FIG. 7 is a screen diagram depicting a user interface for the monitoring and manual control of a structural clamping system for securing a structure during machining according to various embodiments presented herein.

FIG. 7 shows an illustrative screen shot of a user interface 700 on a display 702 of the operator computing device 102 according to one embodiment described herein. According to this embodiment, the force distribution engine 108 provides the user interface 700 for monitoring and manual control of the structural securing system 500. The user interface 700 includes an ID column 704, which identifies each clamp assembly 502 of the structural securing system 500. As previously, the number of clamp assemblies 502 may vary according to the characteristics of the structure 106 being secured. According to the example shown in FIG. 7, there are six clamp assemblies 502 within the sample structural securing system 500.

Similar to the user interface 300 described above with respect to the structural leveling system 200, the user interface 700 includes a force measurement column 706, which displays the current forces measured by each clamp assembly 502. The manual adjustment column 708 provides action buttons for increasing and decreasing the pressure exerted by each clamp assembly 502 to secure the structure 106. The user interface 700 may additionally include a "reset" selection 710 that may be selected to trigger the force distribution engine 108 to re-adjust all of the clamp assemblies 502 to the target force initially applied to the structure. This may be particularly useful when re-engaging the clamp assemblies 502 after a stress relief procedure has been performed.

As with the target forces calculated for the structural leveling system 200, the target forces for the structural securing system 500 may be calculated by the force distribution engine 108 using known engineering techniques or may be input into the user interface 700 to be applied by the force distribution engine 108. Additionally, the user interface 700 may include a "reports" selection 712 that would allow a user to create any number and type of reports using historical load data 112 stored in the database 110.

Figure 8:
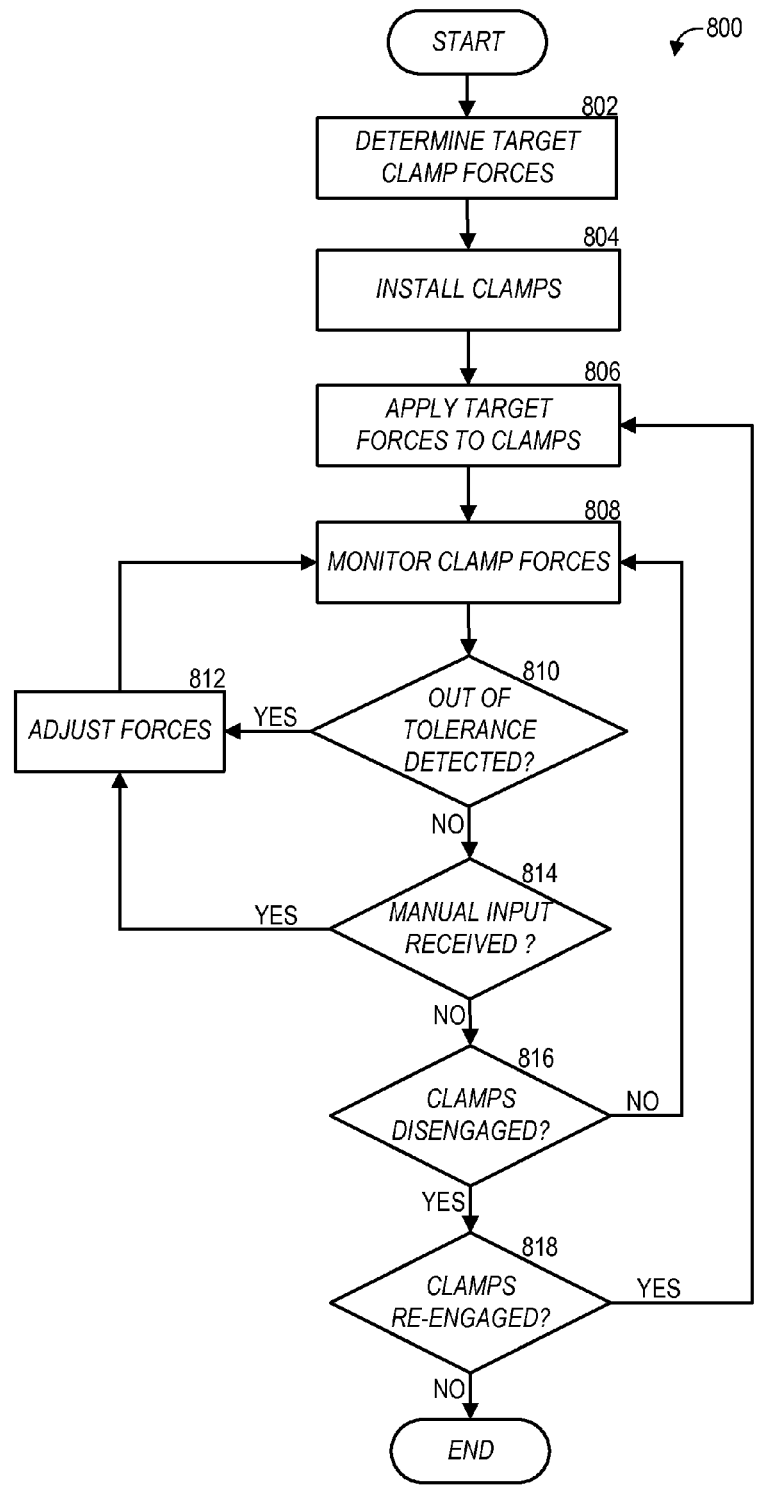
FIG. 8 is a flow diagram illustrating a method for securing a structure during machining according to various embodiments presented herein.

Turning now to FIG. 8, an illustrative routine 800 for securing a structure during machining using the force distribution system 100 will now be described in detail. The routine 800 will be described with respect to the structural securing system 500 embodiment of the force distribution system 100, as shown above in FIGS. 5-7 above. The routine 800 begins at operation 802, where the target forces for each of the clamp assemblies 502 are determined. From operation 802, the routine 800 continues to operation 804, where one or more technicians install the clamp assemblies 502 to secure the structure 106. After the clamp assemblies 502 are installed, the routine 800 continues to operation 806, where the target forces are applied to each of the clamp assemblies 502. It should be appreciated that this initial force application process may occur manually, for example, through the use of the action buttons in the manual adjustment column 708 of the user interface 700, or may be entirely executed by the force distribution engine 108 after a technician chooses the "reset" selection 710 of the user interface 700.

The routine 800 continues from operation 806 to operation 808, where the force distribution engine 108 monitors the force measurements from each of the force sensors of the corresponding clamp assemblies 502 to ensure that they remain within the threshold range of force values. At operation 810, the force distribution engine 108 determines whether any of the force measurements have deviated outside of the applicable threshold range of force values to create an out of tolerance condition at one or more of the clamp assemblies 502. If any of the force measurements have deviated outside of the applicable threshold range of values, the routine 800 proceeds to operation 812, where the force distribution engine 108 sends a control signal to motor of the applicable clamp assembly 502 to adjust the force value back within the threshold range of values. From operation 812, the routine 800 returns to operation 808 and continues as described above.

However, if at operation 810, the force distribution engine 108 does not detect an out of tolerance force measurement, then the routine 800 continues to operation 814, where the force distribution engine 108 determines whether any manual force adjustment input has been received via the user interface 700. If the force distribution engine 108 detects that manual force adjustment input has been received, then the routine 800 proceeds to operation 812, where the force distribution engine 108 sends a control signal to the applicable motor of the targeted clamp assembly 502 to adjust the force value according to the manual input. From operation 812, the routine 800 returns to operation 808 and continues as described above.

If, however, the force distribution engine 108 determines that manual force adjustment input has not been received at operation 814, then the routine 800 continues to operation 816, where the force distribution engine 108 determines if the clamp assemblies 502 have been disengaged. If the clamp assemblies 502 have not been disengaged, then the routine 800 returns to operation 808 and continues as described above. However, if the clamp assemblies 502 have been disengaged to perform a stress relief procedure or because the machining process is complete, then the routine 800 continues from operation 816 to operation 818, where the force distribution engine 108 determines whether the clamp assemblies 502 have been re-engaged. As previously discussed, it is important to re-establish consistent forces on the structure 106 by the clamp assemblies 502 after performing a stress relief procedure and prior to finishing the machining of the structure 106. Accordingly, if it is determined at operation 818 that the clamp assemblies 502 have been re-engaged, then the routine 800 returns to operation 806, where the target forces are re-applied to the clamp assemblies 502 and the routine continues as described above. However, if it is determined at operation 818 that the clamp assemblies 502 have not been re-engaged, then the machining process is complete and the routine 800 ends.

Figure 9:
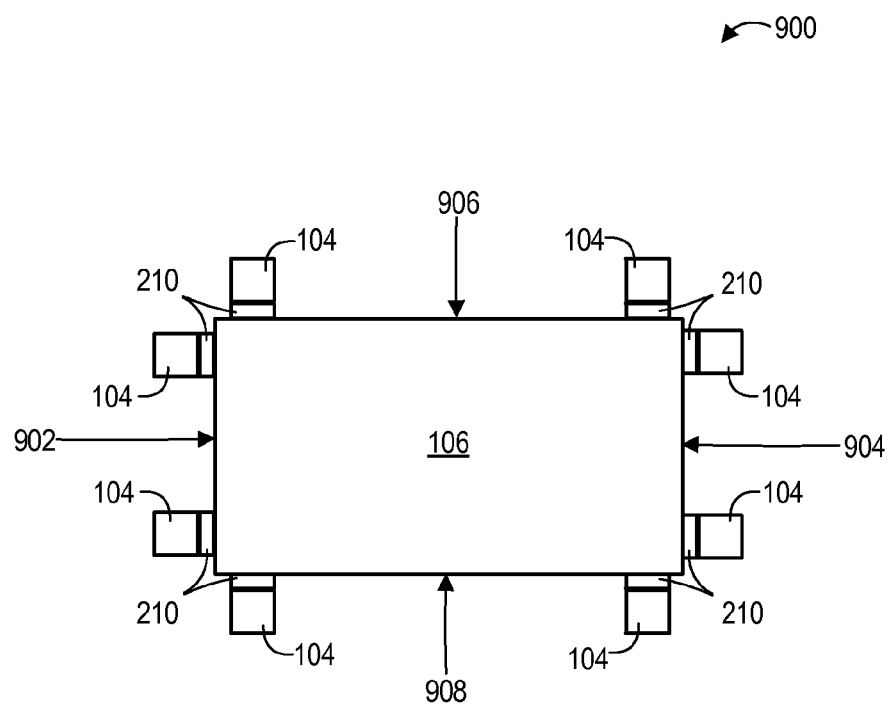
FIG. 9 is a pictorial diagram of a portion of a force distribution system showing force application devices used to secure a structure during transport according to various embodiments presented herein.

FIG. 9 shows a structural transport system 900. The structural transport system 900 is an embodiment of the force distribution system 100 in which the force application devices 104 are used to support and maintain the structure 106 in a desired position while being transported via aircraft, ship, space vehicle, or ground vehicle. During transport, cargo is typically secured using various types tie-down mechanisms. When the transport vehicle accelerates or decelerates in any direction, the cargo applies a force against one or more tie-down mechanisms. If the force is large enough, the tie-down mechanisms could fail, resulting in the cargo shifting position undesirably. Additionally, the forces induced on the shifting cargo may result in a deformation of the cargo being transported. However, it should be clear from the above disclosure that the force application devices 104 may be used in the manner shown in FIG. 9 to apply counteracting forces to the structure 106 being transported in order to properly secure the structure 106 and ensure that the structure 106 is safely transported.

According to the embodiment shown in FIG. 9, force application devices 104 can be placed opposite one another against a left side 902, a right side 904, a top side 906, and a bottom side 908, as well as against a front side and rear side (not shown). Any number of force application devices 104 may be used and placed at any number of locations along each side of the structure 106 in any number of dimensions. In this embodiment, the force sensors 210 may be, or may include, an accelerometer. The accelerometer at each force application device 104 measures the acceleration and deceleration of the structure in the direction of the force application device 104. Upon detecting an acceleration at an accelerometer, the force distribution engine 108 can activate the corresponding force application device 104 to apply an amount of force that will oppose the g-forces at that force application device 104. Doing so will reduce the strain on the tie-down mechanisms and ensure that the structure 106 remains secured. Alternatively, the force application devices 104 may act as the sole means of securing the structure 106, without the use of any tie-down mechanisms. It should be appreciated that the force application devices 104 may be jack assemblies 202, clamp assemblies 502, a combination thereof, or any other device capable of detecting an acceleration or other force and applying a force in the various manners described above.

Figure 10:
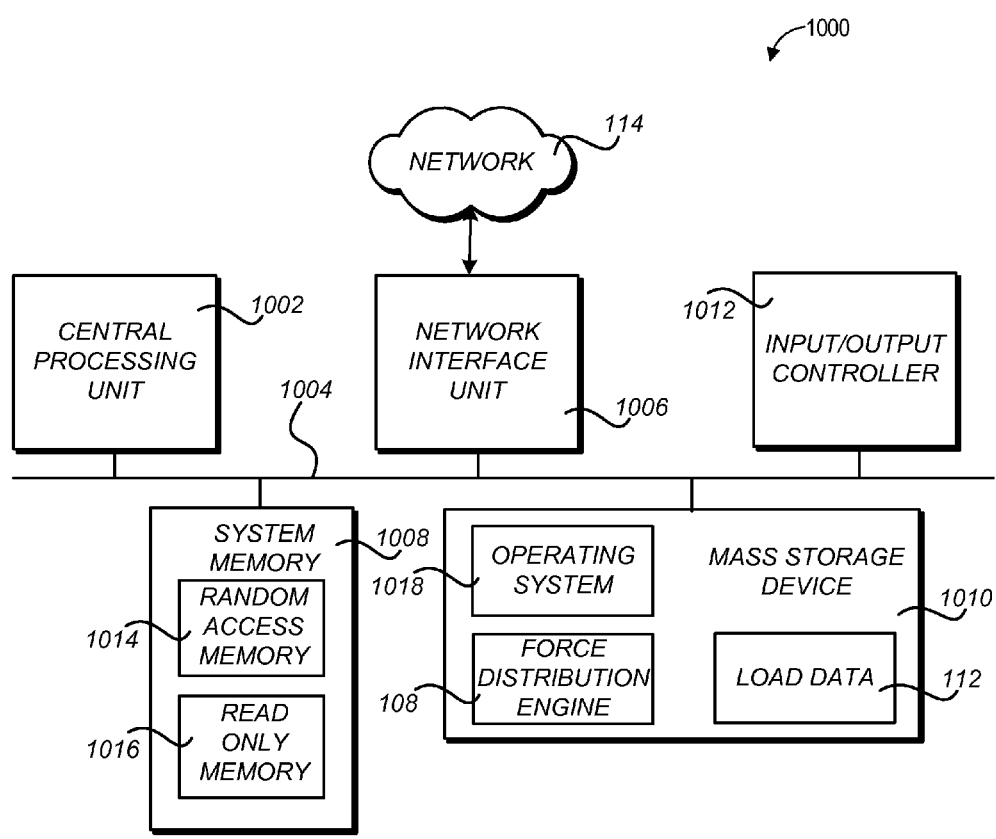
FIG. 10 is a computer architecture diagram showing a computer architecture suitable for implementing the various computer systems described herein.

Referring now to FIG. 10, an illustrative computer architecture for the operator computing device 102 utilized in the various embodiments presented herein will be discussed. The computer architecture shown in FIG. 10 illustrates a conventional desktop, laptop computer, or server computer. The computer architecture shown in FIG. 10 includes a central processing unit 1002 (CPU), a system memory 1008, including a random access memory (RAM) 1014 and a read-only memory (ROM) 1016, and a system bus 1004 that couples the memory to the CPU 1002. A basic input/output system (BIOS) containing the basic routines that help to transfer information between elements within the operator computing device 102, such as during startup, is stored in the ROM 1016. The operator computing device 102 further includes a mass storage device 1010 for storing an operating system 1018, application programs, and other program modules, which will be described in greater detail below.

The mass storage device 1010 is connected to the CPU 1002 through a mass storage controller (not shown) connected to the bus 1004. The mass storage device 1010 and its associated computer-readable media provide non-volatile storage for the operator computing device 102. Although the description of computer-readable media contained herein refers to a mass storage device, such as a hard disk or CD-ROM drive, it should be appreciated by those skilled in the art that computer-readable media can be any available media that can be accessed by the operator computing device 102.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the operator computing device 102.

According to various embodiments, the operator computing device 102 may operate in a networked environment using logical connections to remote computers through the network 114. As described above with respect to FIG. 1, the network 114 may include a wireless network such as, but not limited to, a WLAN such as a WI-FI network, a WWAN, a WPAN such as BLUETOOTH, a WMAN such a WiMAX network, a cellular network, or a satellite network. The network 114 may also be a wired network such as, but not limited to, a wired WAN, a wired LAN such as the Ethernet, a wired PAN, or a wired MAN. The network 114 may include the Internet such that the elements of the force distribution system 100 communicate with one another via wireless or wired connections to the Internet.

The operator computing device 102 may connect to the network 114 through a network interface unit 1006 connected to the bus 1004. It should be appreciated that the network interface unit 1006 may also be utilized to connect to other types of networks and remote computer systems. The operator computing device 102 may also include an input/output controller 1012 for receiving and processing input from a number of other devices, including a keyboard, mouse, or electronic stylus (not shown in FIG. 10). Similarly, an input/output controller may provide output to a display screen, a printer, or other type of output device (also not shown in FIG. 10).

As mentioned briefly above, a number of program modules and data files may be stored in the mass storage device 1010 and RAM 1014 of the operator computing device 102, including the operating system 1018 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 1010 and RAM 1014 may also store one or more program modules. In particular, the mass storage device 1010 and the RAM 1014 may store the force distribution engine 108 and the load data 112. Alternatively, as discussed above, the load data 112 may be stored in the locally or remotely connected database 110. Based on the foregoing, it should be appreciated that methods and systems for applying force to a structure at predetermined locations and monitoring and controlling those forces to maintain a level support position and a secure position for machining or transport are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for supporting a structure, comprising:

supporting the structure on a plurality of force application devices at a plurality of support locations;

applying an upward force to the structure with each of the plurality of force application devices at each of the plurality of support locations, the force at each of the plurality of support locations comprising a force value calculated at least in part by finite analysis of the structure to be substantially equivalent to a desired downward force of the structure at each corresponding support location;

monitoring the upward force applied at each of the plurality of force application devices to detect if the upward force deviates outside of a threshold range of force values, the threshold range of force values comprising a margin of error associated with the desired downward force of the structure at the support location that allows the structure to be supported in the desired position if the upward force applied at the support location is within the margin of error, the upward force sufficient to counteract internal forces within a material of the structure; and adjusting the upward force applied to the structure by a force application device at a support location when the upward force is detected to deviate outside of the threshold range of force values corresponding to the support location.

2. The method of claim 1, wherein supporting the structure on a plurality of force application devices at a plurality of support locations comprises:
   determining the plurality of support locations; and
   installing a force application device at each of the plurality of support locations.

3. The method of claim 2, wherein the desired downward force of the structure at each corresponding support location is determined to allow the structure to be supported in a desired position.

4. The method of claim 1, wherein each force application device comprises a jack and a force sensor, wherein applying the upward force to the structure with each of the plurality of jacks at each of the plurality of support locations comprises activating each jack until the force value as determined by each force sensor is substantially equivalent to the desired downward force of the structure at each corresponding support location, and wherein monitoring the upward force applied at each of the plurality of jacks comprises monitoring the force values measured by each force sensor.

5. The method of claim 1, wherein each force application device comprises a jack and a force sensor, and wherein monitoring the upward force applied at each of the plurality of jacks comprises receiving at a computing device a real-time force measurement from each force sensor.

6. The method of claim 5, wherein applying the upward force, monitoring the upward force, and adjusting the upward force occurs via wireless communication between the computing device and the plurality of force application devices.

7. A method for securing a structure, comprising:
   securing the structure with a plurality of force application devices at a plurality of securing locations;
   applying a force to the structure with each of the plurality of force application devices at each of the plurality of securing locations that is calculated at least in part by finite analysis of the structure and substantially equivalent to the force applied by each of the plurality of force application devices;
   monitoring the force applied at each of the plurality of force application devices to detect if the force deviates outside of a threshold range of force quantities, the threshold range of force quantities comprising a margin of error associated with the desired downward force of the structure at the support location that allows the structure to be supported in the desired position if the upward force applied at the support location is within the margin of error, the upward force sufficient to counteract internal forces within a material of the structure; and
   adjusting the force applied to the structure by a force application device at a support location when the force is detected to deviate outside of the threshold range of force quantities corresponding to the support location.

8. The method of claim 7, wherein each force application device comprises a clamp and a force sensor, and wherein monitoring the force applied at each of the plurality of clamps comprises monitoring force values measured by each force sensor.

9. The method of claim 8, further comprising:
   releasing the force in each of the plurality of clamps to perform a stress relief procedure with the structure during machining; and
   reapplying the force in each of the plurality of clamps after the stress relief procedure is performed such that the force in each of the plurality of clamps after the stress relief procedure is substantially equivalent to the force in each of the plurality of clamps prior to the stress relief procedure.

10. The method of claim 7, further comprising activating a notification mechanism when the force is detected to deviate outside of the threshold range of force quantities corresponding to the support location.

11. The method of claim 10, wherein the notification mechanism comprises a visual indicator or an audible indicator.

* * * * *